(12) United States Patent
Munoz (10) Patent No.: US 7,817,629 B2
(45) Date of Patent: Oct. 19, 2010

(54) METHODS AND APPARATUS FOR PERFORMING NETWORK OPERATIONS ON PACKETS OF DATA IN RESPONSE TO CONTENT OF PARTICULAR USER-SPECIFIED PROTOCOL HEADER FIELDS

(75) Inventor: Robert J. Munoz, Round Rock, TX (US)

(73) Assignee: Agere Systems Inc., Allentown, PA (US)

( * ) Notice: Subject to any disclaimer, the term of this patent is extended or adjusted under 35 U.S.C. 154(b) by 491 days.

(21) Appl. No.: 11/382,942

(22) Filed: May 12, 2006

(65) Prior Publication Data

US 2007/0263619 A1     Nov. 15, 2007

(51) Int. Cl.
    *H04L 12/56* (2006.01)
(52) U.S. Cl. .................................................. 370/389
(58) Field of Classification Search .................. None
    See application file for complete search history.

(56) References Cited

U.S. PATENT DOCUMENTS

| | | | | |
|---|---|---|---|---|
| 5,909,440 A * | 6/1999 | Ferguson et al. | ........... | 370/389 |
| 5,938,736 A * | 8/1999 | Muller et al. | ............... | 370/392 |
| 6,192,051 B1 * | 2/2001 | Lipman et al. | .............. | 370/389 |
| 6,356,951 B1 * | 3/2002 | Gentry, Jr. | .................. | 709/250 |
| 6,553,000 B1 * | 4/2003 | Ganesh et al. | ............. | 370/235 |
| 6,658,482 B1 * | 12/2003 | Chen et al. | .................. | 709/245 |
| 6,754,211 B1 * | 6/2004 | Brown | ........................ | 370/389 |
| 6,804,230 B1 * | 10/2004 | Jennings et al. | ............. | 370/389 |
| 6,822,943 B1 | 11/2004 | Mantin | | |
| 6,836,771 B2 * | 12/2004 | Brown | ........................ | 370/389 |
| 6,859,454 B1 * | 2/2005 | Bowes | ........................ | 370/366 |
| 6,859,455 B1 * | 2/2005 | Yazdani et al. | .............. | 370/392 |
| 6,862,281 B1 * | 3/2005 | Chandrasekaran | .......... | 370/392 |
| 6,922,410 B1 * | 7/2005 | O'Connell | ................... | 370/389 |
| 7,096,277 B2 * | 8/2006 | Hooper | ...................... | 370/389 |
| 7,103,708 B2 * | 9/2006 | Eatherton et al. | ........... | 370/389 |
| 7,106,740 B1 * | 9/2006 | Leelanivas et al. | .......... | 370/392 |
| 7,111,071 B1 * | 9/2006 | Hooper | ....................... | 709/238 |

(Continued)

OTHER PUBLICATIONS

U.S. Appl. No. 11/263,300, filed Oct. 31, 2005, V.N. Kumar et al., entitled "Circuitry for Determining Network Operations in a Network Device."

*Primary Examiner*—Ayaz R Sheikh
*Assistant Examiner*—Timothy J Weidner
(74) *Attorney, Agent, or Firm*—Ryan, Mason & Lewis, LLP (57) ABSTRACT

A network device comprises a plurality of lookup tables and a processor. Each of the plurality of lookup tables comprises a plurality of table inputs that are associated with a plurality of processor instructions. The processor is operative to perform a network operation on a packet of data comprising a plurality of protocol header fields at least in part by performing one or more lookup cycles. A lookup cycle comprises the addressing of one of the plurality of lookup tables with one of the plurality of table inputs and the performing of the processor instruction associated with that table input. At least one of the plurality of processor instructions in the plurality of lookup tables comprises an instruction directing that the content of one of the plurality of protocol header fields be read and that one of the plurality of lookup tables be addressed with that content as the table input.

20 Claims, 3 Drawing Sheets

U.S. PATENT DOCUMENTS

| | | | |
|---|---|---|---|
| 7,133,400 B1* | 11/2006 | Henderson et al. | 370/389 |
| 7,167,471 B2* | 1/2007 | Calvignac et al. | 370/389 |
| 7,436,830 B2* | 10/2008 | Ben-Nun et al. | 370/389 |
| 7,480,242 B2* | 1/2009 | Schwartz et al. | 370/389 |
| 7,492,763 B1* | 2/2009 | Alexander, Jr. | 370/389 |
| 7,525,958 B2* | 4/2009 | Kumar et al. | 370/386 |
| 7,668,890 B2* | 2/2010 | Waters et al. | 370/389 |
| 7,724,737 B1* | 5/2010 | Sindhu et al. | 370/389 |
| 2003/0095559 A1* | 5/2003 | Sano et al. | 370/419 |
| 2003/0115328 A1* | 6/2003 | Salminen et al. | 709/225 |
| 2003/0152078 A1* | 8/2003 | Henderson et al. | 370/389 |
| 2003/0193949 A1* | 10/2003 | Kojima et al. | 370/392 |
| 2004/0015599 A1* | 1/2004 | Trinh et al. | 709/232 |
| 2005/0207409 A1* | 9/2005 | Naik et al. | 370/389 |
| 2006/0182118 A1* | 8/2006 | Lam et al. | 370/395.42 |
| 2007/0115984 A1* | 5/2007 | Kumar et al. | 370/392 |
| 2008/0080505 A1* | 4/2008 | Munoz | 370/392 |
| 2009/0019538 A1* | 1/2009 | Pandya | 726/13 |

\* cited by examiner

| + | BITS 0-3 | 4-7 | 8-15 | 16-18 | 19-31 |
|---|---|---|---|---|---|
| 0 | VERSION | HEADER LENGTH | TYPE OF SERVICE | TOTAL LENGTH | |
| 32 | IDENTIFICATION | | | FLAGS | FRAGMENT OFFSET |
| 64 | TIME TO LIVE | | PROTOCOL | HEADER CHECKSUM | |
| 96 | SOURCE ADDRESS | | | | |
| 128 | DESTINATION ADDRESS | | | | |

| TABLE INPUT | PROCESSOR INSTRUCTION |
|---|---|
| *** | *** |
| *** | *** |
| *** | *** |
| *** | *** |
| *** | *** |
| *** | *** |
| *** | *** |
| *** | *** |

FIG. 6

FIG. 7

METHODS AND APPARATUS FOR PERFORMING NETWORK OPERATIONS ON PACKETS OF DATA IN RESPONSE TO CONTENT OF PARTICULAR USER-SPECIFIED PROTOCOL HEADER FIELDS

FIELD OF THE INVENTION

The present invention is directed to network devices, and, more particularly, to network operations performed in network devices.

BACKGROUND OF THE INVENTION

Packets of data in a computer network typically contain information stored in protocol header fields corresponding to the various protocols that form the protocol stack for that packet of data. A protocol stack is a set of network protocols that work together so that two or more computers or other devices can communicate across a network. The different protocols that form a protocol stack frequently occupy different "layers" in the Open System Interconnection (OSI) Model. A commonly used protocol stack consists of the HyperText Transfer Protocol (HTTP), Transmission Control Protocol (TCP), Internet Protocol (IP) and Ethernet protocols.

A network processor in a network device will typically determine which network operation to perform on a packet of data by either executing software or by addressing fixed function hardware that addresses one or more lookup tables. A common technique, especially when using fixed function hardware, is to use a content-addressable memory (CAM) to allow only fields of interest in a fixed portion of the protocol header fields to be examined and acted upon. Whether a CAM is used or not, typically only a subset of the protocol header fields in the packet of data is utilized in making the determination. The particular protocol header fields that form this subset vary with the network environment and with the network device user. For example, a specific network device user may wish that fields in the Asynchronous Transfer Mode (ATM) Protocol, TCP, IP and Ethernet protocols be utilized to determine how to properly forward the packet of data to the next network device. A different network device user may wish to utilize an entirely different set of protocol header fields. As a result, it is frequently desirable to tailor the network device's software or associated CAM to match the network device user's specific application.

Notwithstanding this, such user-specific tailoring remains problematic. For example, programming network device software specifically for a network device user's particular application may be expensive. Moreover, such user-specific software programming lacks flexibility since the protocol header fields to be examined are fixed at the time the device software is written. As a result, most device manufacturers supply the same software to multiple network device users rather than attempt customization. This multi-user software will examine the union of what individual network device users may be interested in examining rather than addressing the particular needs of the specific network device user. Consequently, this software may examine many protocol header fields that are not of interest to a particular network device user while skipping over those that are of interest.

Likewise, using an external CAM to provide packet classification flexibility is also a limited solution. The cost of a CAM is largely a function of its table storage capacity. A CAM capable of storing a table of sufficient width and size to examine all the protocol header fields of interest to a specific network device user is, as a result, frequently too expensive to be practical.

For these reasons, there is a need for methods and apparatus allowing a network device to be easily and cost-effectively tailored by the network device user to perform network operations on packets of data in response to the content of particular user-specified protocol header fields.

A related patent application is U.S. patent application Ser. No. 11/263,300, entitled "Circuitry for Determining Network Operations in a Network Device" (filed Oct. 31, 2005), which is incorporated herein by reference.

SUMMARY OF THE INVENTION

Embodiments of the present invention address the above-identified need by providing methods and apparatus allowing network devices to be tailored to perform network operations on packets of data in response to the content of particular user-specified protocol header fields.

In accordance with an aspect of the invention, a network device is operative to perform a network operation on a packet of data in a network, the packet of data having information populating a plurality of protocol header fields. The network device comprises a plurality of lookup tables and a processor. Each of the plurality of lookup tables comprises a plurality of table inputs and a plurality of processor instructions. Each table input in the plurality of table inputs is associated with a respective processor instruction in the plurality of processor instructions. The processor is operative to perform the network operation on the packet of data at least in part by performing one or more lookup cycles. A lookup cycle comprises the addressing of one of the plurality of lookup tables with one of the plurality of table inputs and the performing of the processor instruction associated with that input. At least one of the plurality of processor instructions in the plurality of lookup tables comprises an instruction directing that the content of one of the plurality of protocol header fields be read and that one of the plurality of lookup tables be addressed with that content as the table input.

In accordance with an illustrative embodiment of the invention, a network device comprises a router. The router performs a network operation on a packet of data in association with a local area network (LAN). The router contains a network processor which, in turn, comprises both processing circuitry and table lookup circuitry. Moreover, the router contains several lookup tables which associate table inputs with processor instructions. The router both determines which network operation to perform on the packet of data and actually performs the network operation by executing one or more lookup cycles. In each lookup cycle, the table lookup circuitry addresses a lookup table with a table input and the processing circuitry executes the returned processor instruction.

Advantageously, the use of lookup cycles allows the network device to be easily and cost-effectively tailored by the network device user to perform network operations on the packet of data in response to the content of particular user-specified protocol header fields These and other features and advantages of the present invention will become apparent from the following detailed description which is to be read in conjunction with the accompanying drawings.

DETAILED DESCRIPTION OF THE INVENTION

The present invention will be described with reference to illustrative embodiments. For this reason, numerous modifications can be made to these embodiments and the results will still come within the scope of the invention. No limitations with respect to the specific embodiments described herein are intended or should be inferred.

The term "network device" as used herein may comprise any type of electronic device capable of performing network operations on packets of data in a computer network. Such network devices may include, but are not limited to, routers, gateways, bridges, switches, hubs and repeaters. These devices and their many variants will be familiar to one skilled in the art. Examples of such network devices are also described in, e.g., P. Seifert, *The Switch Book: The Complete Guide to LAN Switching Technology*, Wiley, 2000, which is incorporated herein by reference.

In addition, the term "packet of data" as used herein is intended to encompass any unit of data for transmission in a computer network. No limitations as to the size, content or format of the data is intended by the use of this terminology. Moreover, when reference is made herein to the content of a protocol header field, the term "content" is intended to encompass all or just a portion of the information stored in the given protocol header field. Lastly, the term "processor instruction" as used herein is intended to encompass directions given to a processor for execution by that processor. A single processor instruction may include a single step or may include several steps.

Figure 1:
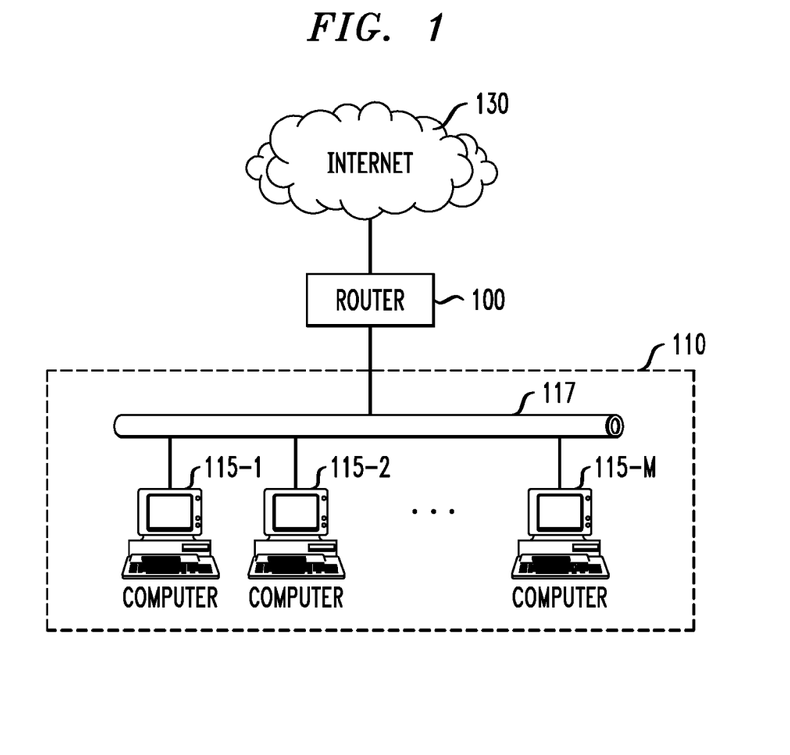
FIG. 1 shows a block diagram of a computer network in which an illustrative embodiment of the present invention is implemented.

For simplicity in describing the present invention, the invention will be illustrated with an embodiment comprising a router acting in conjunction with a simple LAN. FIG. 1 shows a router 100 implemented to service a LAN 110. In this implementation, the router is the interface between the LAN and the larger internet 130. The LAN is shown to contain M computers, labeled 115-i, where i=1, 2 . . . M. The computers are connected to each other and to the router via Ethernet cabling 117.

Figure 2:
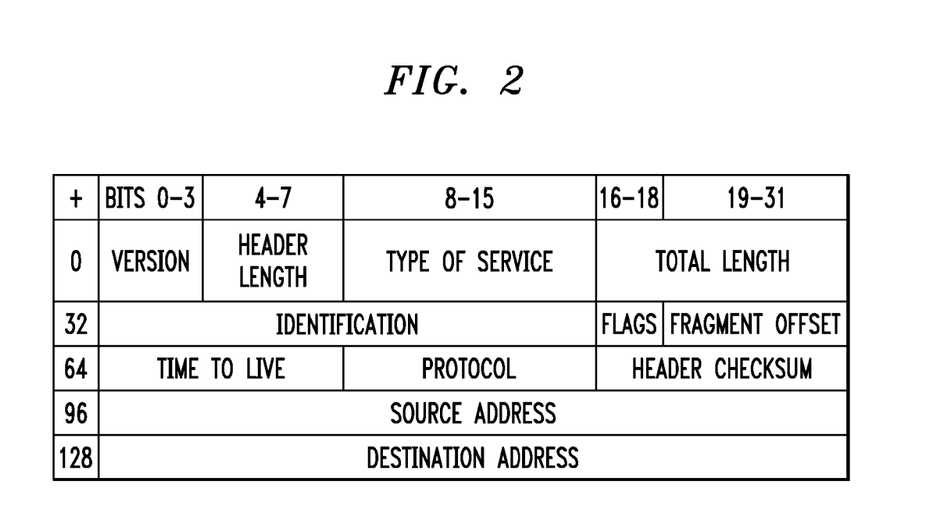
FIG. 2 shows a table of the protocol header fields in the IP protocol.

A packet of data reaching the router 100 will contain information populating various protocol header fields associated with the protocol stack for that particular packet of data. As mentioned earlier, a packet of data in the internet will frequently comprise protocol header fields corresponding to the HTTP, TCP, IP and Ethernet protocols. However, a packet of data may contain protocol header fields belonging to any other network protocols, and this will not affect the functionality of the invention. FIG. 2 shows a table of the protocol header fields associated with the IP protocol (version 4). This table also indicates how the different fields are assigned to the bits that make up the IP protocol header information. Similar tables are readily available for other protocols and, as a result, are not reproduced herein.

One skilled in the art will recognize the meaning of each of the protocol header fields shown in FIG. 2. Moreover, the organization and the meaning of the protocol header fields for all the network protocols is largely based on standards created by the Internet Engineering Task Force (IETF) in the form of Requests for Comments (RFCs). For example, RFC 791 describes in detail the protocol header fields of the IP protocol shown in FIG. 2. These RFCs are commonly available, e.g., at the IETF web site, and are incorporated herein by reference.

Figure 3:
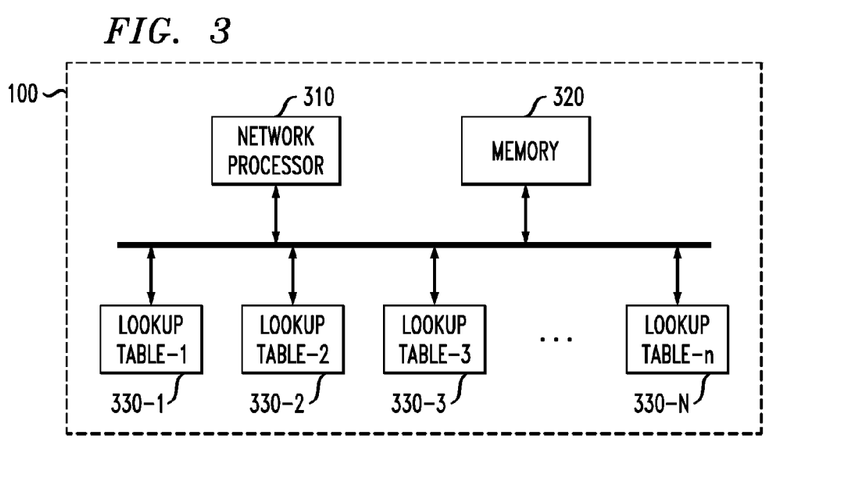
FIG. 3 shows a block diagram illustrating a network device according to an illustrative embodiment of the present invention.
Figure 4:
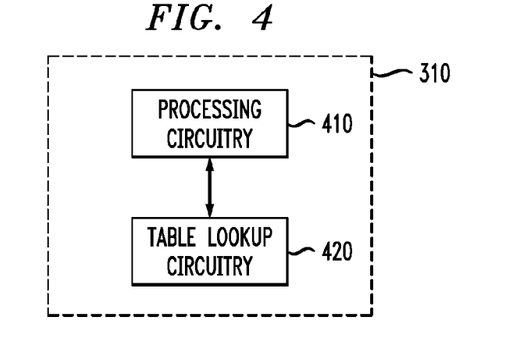
FIG. 4 shows a block diagram of the processor in the FIG. 3 device.

FIGS. 3 and 4 show block diagrams of the elements contained in the router 100. FIG. 3 indicates that the router contains a network processor 310 as well as a memory 320. In addition, the router also contains N lookup tables, labeled 330-i where i=1, 2 . . . N. FIG. 4 shows a further breakdown of the network processor. In accordance with an aspect of this invention, the network processor comprises two forms of circuitry: processing circuitry 410 and table lookup circuitry 420.

Figure 5:
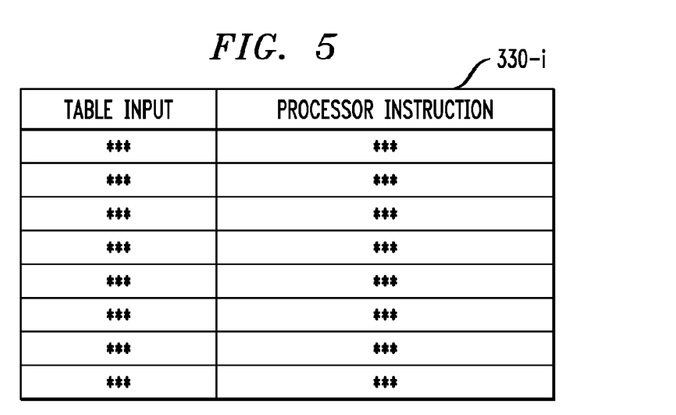
FIG. 5 shows the configuration of one of the lookup tables in the FIG. 3 device.

FIG. 5 shows the configuration of one of the lookup tables 330-i in the FIG. 3 device. In accordance with an aspect of the invention, the lookup table comprises a plurality of table inputs and a plurality of processor instructions. Each table input is associated with a respective processor instruction. The content of the table inputs and processor instructions in the various lookup tables will become apparent to one skilled in the art from the following discussion.

In accomplishing its functions, the router 100, like other network devices, will determine which network operation to perform on a particular packet of data and then actually perform that network operation. Determining which network operation to perform requires that the router examine a sufficient amount of relevant information in the packet of data. The relevant information will most often populate the packet's protocol header fields. In the present invention, both the determining of information about a packet of data and the performing of network operations are accomplished by executing one or more lookup cycles. A lookup cycle in this embodiment comprises two steps. In the first step, the lookup cycle circuitry 420 addresses one of the lookup tables 330-i with a table input. In the second step, the processing circuitry 410 performs the processor instruction associated with that table input.

The performance of these lookup cycles on a packet of data in the router 100 will now be described with reference to FIG. 6. Step 610 in FIG. 6 comprises the receiving of a packet of data. The next step, step 620, comprises having the processing circuitry determine both an initial table input for the received packet of data and the identity of an initial lookup table. If the router receives incoming packets of data on a multiplicity of ports, the initial table input may be, for example, the port number for the received packet of data. Alternatively, the initial table input may be the content of a particular protocol header field.

Figure 6:
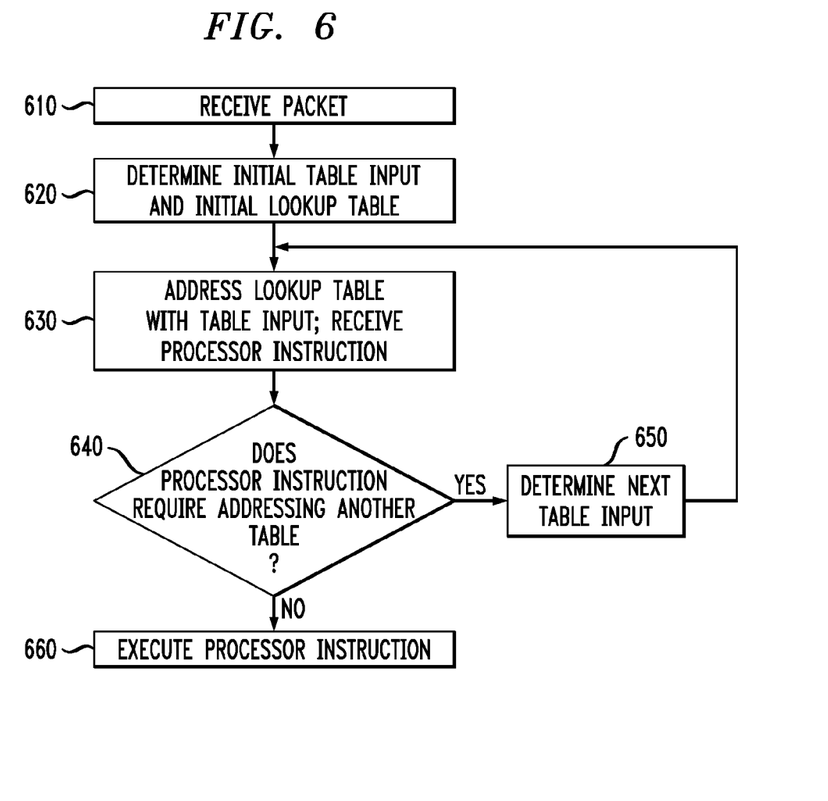
FIG. 6 shows a flow diagram of a process for performing a network operation in the FIG. 3 device.

In step 630 in FIG. 6, the table lookup circuitry 420 addresses a lookup table 330-i with the last-determined table input and receives the processor instruction associated with that table input. If this step is performed immediately after step 620, the table lookup circuitry will address the initial lookup table with the initial table input. For example, if, as described above, the initial table input is the port number for the received packet of data, step 630 would comprise using the port number as the table input in the initial lookup table. The returned result would then be the processor instruction associated with that particular port number.

As stated earlier, a processor instruction will comprise one or more steps to be performed by the processing circuitry 410 and/or table lookup circuitry 420 in the network processor 310. A processor instruction in this embodiment may fall into one of two categories. If the processor has not examined enough information in the packet of data to determine which network operation to perform on that received packet of data, the next received processor instruction will direct the processor to gather more information about the received packet of data by executing another lookup cycle. For example, the next processor instruction may direct the processing circuitry to read the content of a particular protocol header field and direct the table lookup circuitry to address another lookup table with that content as the table input.

Alternatively, if the amount of information examined at step 630 in the received packet of data is sufficient to determine the particular network operation that is to be performed on that received packet of data, the gathering of additional information about the packet of data is no longer necessary. In this case, no additional lookup cycles are necessary and the processor instruction received in step 630 will indicate exactly what network operation is to be performed on the packet of data.

Step 640 determines into which of these two categories the received processor instruction falls. If, on the one hand, the processor instruction calls for the addressing of another lookup table, step 650 is executed. Step 650 has the processing circuitry execute the processor instruction received in step 630. The execution of this processor instruction will preferably both determine the next table input and determine the identity of the next lookup table 330-i to which this table input should be addressed. Step 630 is then performed again, thereby causing another lookup cycle to be executed. If, on the other hand, the processor instruction received in step 630 does not call for another lookup table to be addressed, the processing circuitry performs the network operation on the received packet of data in step 660.

It is to be appreciated that, depending on the precise composition of the lookup tables, some network operations may be performed in one lookup cycle while other network operations may require that several lookup cycles be executed.

A more concrete example may be helpful in further understanding the process flow described in FIG. 6. Let it be assumed that the router 100 is operative to determine the particular way in which to forward a received packet of data based on three pieces of information about the packet of data: 1) the port number corresponding to the port on which the packet of data is received; 2) the content of the packet's source address in the IP protocol header fields; and 3) the content of the packet's destination address in the IP protocol header fields. After receiving the packet of data instep 610 of FIG. 6, the processing circuitry 410 determines the initial table input and the identity of the initial lookup table in step 620. In this particular case, the initial table input is the port number of the port on which the packet of data was received, and the initial lookup table is the first lookup table 330-1. In step 630, the table lookup circuitry 420 addresses the first lookup table with the port number. Since this information in itself is insufficient to determine how to forward the packet of data, another lookup cycle is required. Accordingly, the second processor instruction returned in step 630 comprises an instruction directing the processing circuitry to read the content of the source address of the received packet of data and directing the table lookup circuitry to address the second lookup table 330-2 with this content as the table input. The content of the source address is read in step 650 and this content is used to address the second lookup table in step 630.

Again, since the information is insufficient to determine how to forward the packet of data, a third lookup cycle is required. The third returned processor instruction is configured to direct the processing circuitry to read the content of the destination address protocol header field and to direct the table lookup circuitry to address the third lookup table 330-3 with this content. The content of the destination address is read in step 650 and this content is used to address the third lookup table in step 630. Here the returned result no longer requires the network processor 310 to gather more information about the packet of data since the packet of data's port number, source address and destination address have each been examined. The third returned processor instruction directs the processing circuitry to forward the packet of data in a particular way. This third processor instruction is executed in step 660. Hence, three lookup cycles are executed in performing this particular forwarding operation on the received packet of data.

While the previous example was limited to protocol header fields in the IP protocol, it is again important to recognize that the invention is not limited to the examination and extraction of information from any single protocol. To the contrary, the invention is easily scaled to determine network operations on packets of data containing protocol header fields for a large number of different protocols. The application of the invention to a single protocol in the above example, therefore, is entirely for simplicity of illustration, and no limitations should be inferred therefrom.

It should also be noted that a given processor instruction may be more extensive than those just recited. They may also include, for example, instructions to the processing circuitry 410 to store information and/or retrieve information from the memory 320, or to store data into one or more of the lookup tables 330-i. This maybe useful in those situations where information determined in one lookup cycle is utilized in a subsequent lookup cycle. Moreover, a processor instruction may further comprise an instruction directing the processing circuitry to rewrite at least a portion of the packet of data with information stored in the memory. These functions add considerable flexibility to what can be accomplished with lookup tables.

When a processor instruction directs that the processing circuitry 410 read the content of a particular protocol header field, the particular protocol header field can be identified in various ways. A given protocol header field in a packet of data typically has a fixed starting location and length, each parameter usually expressed in bits. A processor instruction may therefore identify a particular protocol header field by its starting location and length. Alternatively, a particular protocol header field can be identified by its location in relation to the last protocol header field read by the processing circuitry. For example, the processor instruction may direct the processing circuitry to skip ahead in the packet of data a certain number of bits from the location of the last read bit and to then read a certain number of bits. Nonetheless, these methods of identifying a protocol header field in a processor instruction are merely illustrative and other methods may be used and still come within the scope of the invention. Those skilled in the art will recognize the other forms that the processor instructions may take.

The many operations that a network device may be called upon to perform on a packet of data in a network will also be familiar to one skilled in the art. Nonetheless, for a router, for example, such operations may include determining to which address and through which port to forward a packet of data. Moreover, a router may be called upon to discard packets of data in order to implement a kind of firewalling or filtering.

Finally, a router may be asked to translate network addresses from one format to another, a process commonly referred to as address mapping or network address translation.

To fulfill its functions, the network processor 310 will step through one or more lookup cycles. These capabilities are preferably provided by instructions implemented in device software. However, in accordance with one of the advantages of this invention, beyond the initial lookup cycle, the device software is not determinative of which information contained in the received packet of data will be used in determining the network operation for that packet of data. Rather, the device software merely guides the processing circuitry 410 in executing the lookup cycles. In this way, the lookup tables 330-i themselves, rather than the device software, can be tailored to examine only those protocol header fields relevant to a particular network device user's specific network application when determining the network operations to perform on received packets of data. There is, as a result, no need to customize the device software for that particular network device user's application.

The particular method of programming the lookup tables 330-i will depend on the physical implementation of these tables. Nevertheless, generally, the programming of the lookup tables may be accomplished by utilizing software acting in concert with the processing circuitry 410 to address and configure the lookup tables. The act of programming the lookup tables can be accomplished, for example, by the network device user or by the manufacturer of the network device in response to the wishes of that user. It is preferable, however, that the network device user be provided with "user-friendly" software with which to modify the lookup tables in response to that user's changing needs. This helps to accomplish the goal of providing a method of configuring a network device that is both easy and cost-effective to tailor to a specific network device user's application.

With respect to the physical implementation of the elements in FIGS. 3 and 4, there are many possible variations falling within the scope of this invention. The processing circuitry 410 and the table lookup circuitry 420 may, for example, be formed in two or more discrete integrated circuits or in just a single integrated circuit. From the perspective of power consumption and performance, however, it is preferable that the processing circuitry and the table lookup circuitry be formed together in a single integrated circuit. Moreover, the memory 320 may be formed in a discrete integrated circuit or embedded in the same integrated circuit as the processing circuitry and/or table lookup circuitry. Such embedding of memory circuitry into a logic-based integrated circuit is well known in the art. Embedded memory circuitry, for example, will frequently be produced as static random access memory (SRAM) using complementary metal-oxide-semiconductor (CMOS) technology. In SRAM, the state of a memory element may be programmed, for example, by configuring the state of digital inverters.

However, it should be understood that the memory 320, whether embedded or discrete, may be implemented in any type of memory circuitry and still fall within the scope of the invention. For example, the memory may be formed in a dynamic random access memory (DRAM), wherein the states of the memory elements are stored as charge on capacitors.

The lookup tables 330-i may also take on various physical forms and still come within the scope of the invention. For instance, the tables may be implemented in a volatile DRAM device or a non-volatile flash-type memory. In addition, it may be advantageous to implement one or more of the lookup tables in a CAM. CAMs are frequently implemented for search-intensive tasks like lookup functions because they are much faster than algorithmic approaches for search intensive applications. CAMs are composed of conventional semiconductor memory, usually SRAM, with added comparison circuitry that enables a search operation to be completed in a single clock cycle. However, as mentioned before, the cost of a CAM is related to its table storage capacity.

It is noted that there are many techniques of making table lookups, each of which will be familiar to one skilled in the art. These include, but are not limited to, exact match, range match, longest prefix match and ordered search techniques. The choice of one of these techniques will be specific to the particular network application. Any one of these lookup methods would fall within the scope of this invention.

Figure 7:
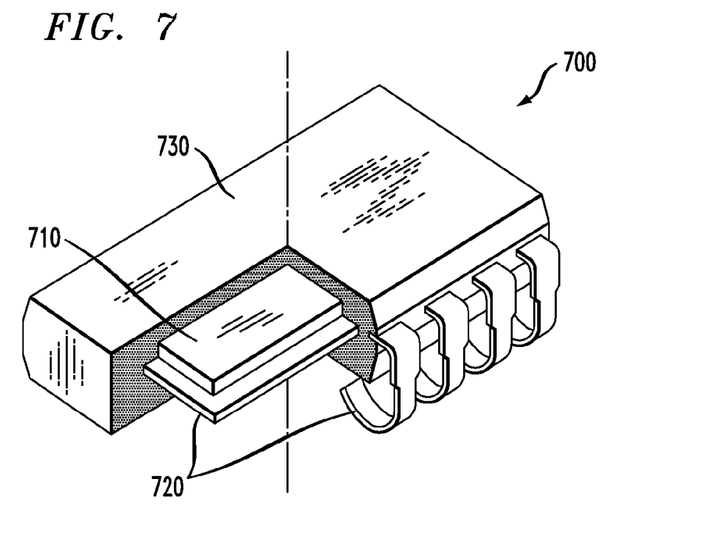
FIG. 7 shows a perspective view of a packaged integrated circuit embodying features of the present invention with the package partially cut away.

Importantly, an integrated circuit including a processor comprising features of this invention falls within the scope of this invention. The formation of integrated circuits is well known in the art. Generally, a plurality of identical die is formed in a repeated manner on a surface of a semiconductor wafer. Each die includes a device described herein, and may include other structures or circuits. The individual die are cut or diced from the wafer, then packaged as an integrated circuit. FIG. 7 shows an integrated circuit die 700 consistent with this invention packaged in a typical plastic leadframe package. The packaged die comprises a die 710 attached to a leadframe 720. A plastic mold 730 encapsulates the die and a portion of the leadframe. One skilled in the art would know how to dice wafers and package die to produce integrated circuits.

It should also again be emphasized that the above-described embodiments of the invention are intended to be illustrative only. Other embodiments can use different types and arrangements of elements and steps for implementing the described functionality. These numerous alternative embodiments within the scope of the following claims will be apparent to one skilled in the art.

What is claimed is:

1. A network device operative to perform a network operation on a packet of data in a network, the packet of data having information populating a plurality of protocol header fields, the network device comprising:

a plurality of lookup tables, each lookup table comprising a plurality of table inputs and a plurality of processor instructions, each table input in the plurality of table inputs associated with a respective processor instruction in the plurality of processor instructions; and a processor, the processor being operative to perform the network operation on the packet of data at least in part by performing one or more lookup cycles, a lookup cycle comprising the addressing of one of the plurality of lookup tables with one of the plurality of table inputs and the performing of the processor instruction associated with that table input;

wherein at least one of the plurality of processor instructions in the plurality of lookup tables comprises an instruction directing that the content of one of the plurality of protocol header fields be read and that one of the plurality of lookup tables be addressed with that content as the table input;

wherein the plurality of lookup tables comprises N lookup tables, with N being greater than 2; and wherein a first one of the N lookup tables is addressed by an initial table input and each subsequent one of the N lookup tables is addressed in turn by a table input that is specified by one of the processing instructions read from an immediately preceding one of the N lookup tables, and the one of the processing instructions read from the immediately preceding one of the N lookup tables determines which one of the N lookup tables is to be addressed by the specified table input, such that the processing instructions read from respective ones of the N lookup tables other than a final one of the N lookup tables collectively define a particular processing order for the plurality of protocol header fields;

wherein a given one of the plurality of processor instructions in a given one of the plurality of lookup tables specifies both which one of the plurality of protocol header fields is to be read and which one of the N lookup tables is to be addressed.

2. The network device of claim 1, wherein the network device receives packets of data on a plurality of ports, each port identifiable by a port number, and at least one of the plurality of table inputs in the plurality of lookup tables comprises a port number.

3. The network device of claim 1, wherein the processor is implemented in an integrated circuit.

4. The network device of claim 1, wherein the network device further comprises a memory.

5. The network device of claim 4, wherein the processor and the memory are both at least partially implemented in one integrated circuit.

6. The network device of claim 4, wherein at least one of the plurality of processor instructions in the plurality of lookup tables comprises an instruction directing that information be stored in the memory.

7. The network device of claim 4, wherein at least one of the plurality of processor instructions in the plurality of lookup tables comprises an instruction directing that the content of one of the plurality of protocol header fields be stored in the memory.

8. The network device of claim 4, wherein at least one of the plurality of processor instructions in the plurality of lookup tables comprises an instruction directing that information from the memory be retrieved.

9. The network device of claim 4, wherein at least one of the plurality of processor instructions in the plurality of lookup tables comprises an instruction directing that at least a portion of the packet of data be rewritten with information stored in the memory.

10. The network device of claim 1, wherein at least one of the plurality of processor instructions in the plurality of lookup tables comprises an instruction directing that the packet of data be forwarded to another network device.

11. The network device of claim 1, wherein at least one of the plurality of processor instructions in the plurality of lookup tables comprises an instruction directing that address translation be performed on the packet of data.

12. The network device of claim 1, wherein at least one of the plurality of processor instructions in the plurality of lookup tables comprises an instruction directing that the packet of data be discarded.

13. The network device of claim 1, wherein at least one of the plurality of lookup tables is at least partially implemented in a random-access memory.

14. The network device of claim 1, wherein at least one of the plurality of lookup tables is at least partially implemented in a non-volatile memory.

15. The network device of claim 1, wherein at least one of the plurality of lookup tables is at least partially implemented in a content-addressable memory.

16. The network device of claim 1, wherein each of the plurality of protocol header fields in the packet of data is identifiable by a starting location and a length, and wherein the at least one processor instruction comprising reading the content of one of the plurality of protocol header fields and addressing one of the plurality of lookup tables with that content as the table input identifies the one of the plurality of protocol header fields by its starting location and length.

17. The network device of claim 1, wherein the network device comprises at least one of a router, a gateway, a bridge, a switch, a hub and a repeater.

18. A processor for use in a network device operative to perform a network operation on a packet of data in a network, the packet of data having information populating a plurality of protocol header fields and the network device comprising a plurality of lookup tables, each lookup table comprising a plurality of table inputs and a plurality of processor instructions, each table input in the plurality of table inputs associated with a respective processor instruction in the plurality of processor instructions, the processor comprising:

processing circuitry; and table lookup circuitry;

wherein the processor is operative to perform the network operation on the packet of data at least in part by performing one or more lookup cycles, a lookup cycle comprising the table lookup circuitry addressing one of the plurality of lookup tables with one of the plurality of table inputs and the processing circuitry performing the processor instruction associated with that table input;

wherein at least one of the plurality of processor instructions in the plurality of lookup tables comprises an instruction directing that the content of one of the plurality of protocol header fields be read and that one of the plurality of lookup tables be addressed with that content as the table input;

wherein the plurality of lookup tables comprises N lookup tables, with N being greater than 2; and wherein a first one of the N lookup tables is addressed by an initial table input and each subsequent one of the N lookup tables is addressed in turn by a table input that is specified by one of the processing instructions read from an immediately preceding one of the N lookup tables, and the one of the processing instructions read from the immediately preceding one of the N lookup tables determines which one of the N lookup tables is to be addressed by the specified table input, such that the processing instructions read from respective ones of the N lookup tables other than a final one of the N lookup tables collectively define a particular processing order for the plurality of protocol header fields;

wherein a given one of the plurality of processor instructions in a given one of the plurality of lookup tables specifies both which one of the plurality of protocol header fields is to be read and which one of the N lookup tables is to be addressed.

19. The processor of claim 18, wherein the processing circuitry and the table lookup circuitry are implemented in one or more integrated circuits.

20. A method for performing a network operation on a packet of data in a network, the packet of data having information populating a plurality of protocol header fields, the method to be performed by a processor in a network device having a plurality of lookup tables, each lookup table comprising a plurality of table inputs and a plurality of processor instructions, each table input in the plurality of table inputs associated with a respective processor instruction in the plurality of processor instructions, the method comprising:

performing one or more lookup cycles, a lookup cycle including the steps of:

addressing one of the plurality of lookup tables with one of the plurality of table inputs; and performing the processor instruction associated with that table input;

wherein at least one of the plurality of processor instructions in the plurality of lookup tables comprises an instruction directing that the content of one of the plurality of protocol header fields be read and that one of the plurality of lookup tables be addressed with that content as the table input;

wherein the plurality of lookup tables comprises N lookup tables, with N being greater than 2; and wherein a first one of the N lookup tables is addressed by an initial table input and each subsequent one of the N lookup tables is addressed in turn by a table input that is specified by one of the processing instructions read from an immediately preceding one of the N lookup tables, and the one of the processing instructions read from the immediately preceding one of the N lookup tables determines which one of the N lookup tables is to be addressed by the specified table input, such that the processing instructions read from respective ones of the N lookup tables other than a final one of the N lookup tables collectively define a particular processing order for the plurality of protocol header fields;

wherein a given one of the plurality of processor instructions in a given one of the plurality of lookup tables specifies both which one of the plurality of protocol header fields is to be read and which one of the N lookup tables is to be addressed.

* * * * *